(12) United States Patent
Ratner et al.

(10) Patent No.: US 8,238,637 B2
(45) Date of Patent: *Aug. 7, 2012

(54) COMPUTER-AIDED DIAGNOSIS OF MALIGNANCIES OF SUSPECT REGIONS AND FALSE POSITIVES IN IMAGES

(75) Inventors: Eliahu Ratner, Jerusalem (IL); Philippe Nathan Bamberger, Jerusalem (IL)

(73) Assignee: Siemens Computer Aided Diagnosis Ltd., Jerusalem (IL)

( * ) Notice: Subject to any disclaimer, the term of this patent is extended or adjusted under 35 U.S.C. 154(b) by 1323 days.

This patent is subject to a terminal disclaimer.

(21) Appl. No.: 11/876,851

(22) Filed: Oct. 23, 2007

(65) Prior Publication Data

US 2008/0107323 A1 May 8, 2008

Related U.S. Application Data

(60) Provisional application No. 60/854,096, filed on Oct. 25, 2007.

(51) Int. Cl.
*G06K 9/00* (2006.01)
*G06K 9/32* (2006.01)

(52) U.S. Cl. .................................... 382/132; 382/293

(58) Field of Classification Search ................ None
See application file for complete search history.

(56) References Cited

U.S. PATENT DOCUMENTS

| | | | | |
|---|---|---|---|---|
| 5,828,774 A * | 10/1998 | Wang | | 382/128 |
| 6,898,532 B1 * | 5/2005 | Toh et al. | | 702/22 |
| 7,295,706 B2 * | 11/2007 | Wentland et al. | | 382/181 |
| 7,840,046 B2 * | 11/2010 | Jerebko et al. | | 382/128 |
| 2003/0194121 A1 * | 10/2003 | Eberhard et al. | | 382/132 |
| 2004/0008891 A1 * | 1/2004 | Wentland et al. | | 382/209 |
| 2004/0264627 A1 * | 12/2004 | Besson | | 378/5 |
| 2005/0262031 A1 * | 11/2005 | Saidi et al. | | 706/21 |
| 2006/0224529 A1 * | 10/2006 | Kermani | | 706/13 |
| 2007/0003118 A1 * | 1/2007 | Wheeler et al. | | 382/128 |
| 2008/0025592 A1 * | 1/2008 | Jerebko et al. | | 382/132 |
| 2008/0069416 A1 * | 3/2008 | Luo | | 382/128 |
| 2008/0107323 A1 * | 5/2008 | Ratner et al. | | 382/132 |
| 2008/0143724 A1 * | 6/2008 | Russakoff | | 345/441 |

(Continued)

FOREIGN PATENT DOCUMENTS

WO    02/25588 A    3/2002

OTHER PUBLICATIONS

Russakoff et al., "Generation and Application of a Probabilistic Breast Cancer Atlas", Medical Image Computing and Computer-Assisted Intervention—MIC CAI 2006 Lecture Notes in Computer Science, LNCS, Springer, Berlin, DE, vol. 4191, Sep. 29, 2006, pp. 454-461.

(Continued)

*Primary Examiner* — Brian P Werner
*Assistant Examiner* — Tahmina Ansari
(74) *Attorney, Agent, or Firm* — Peter Withstandley (57) ABSTRACT

A method for diagnosing malignancy of suspect regions in a 2D imaging projection of a body organ of a subject comprising the steps of: normalizing the image projection to map regions thereof onto a standard shape; extracting location of regions mapped on the standard shape and using normalized position of a suspect region to assess likelihood that it is malignant.

25 Claims, 5 Drawing Sheets

U.S. PATENT DOCUMENTS

2009/0214096 A1* 8/2009 Andrushkiw et al. ........ 382/131
2010/0158332 A1* 6/2010 Rico et al. .................... 382/128

OTHER PUBLICATIONS

Good et at, "Generalized Procrustean image deformation for subtraction of mammograms", Proceedings of the SPIE—The International Society for Optical Engineering SPIE—Int. Soc. Opt. Eng USA, vol 3661, 1999, pp. 1562-1573.

International Search Report including Notification of Transmittal of the International Search Report, International Search Report, and Written Opinion of the International Searching Authority.

* cited by examiner

COMPUTER-AIDED DIAGNOSIS OF MALIGNANCIES OF SUSPECT REGIONS AND FALSE POSITIVES IN IMAGES

CROSS REFERENCE TO RELATED APPLICATION

The present application claims priority rights from U.S. Provisional Application 60/854,096, filed on Oct. 25, 2006.

FIELD OF THE INVENTION

The present invention is directed to a method of diagnosing malignancies and false positives and to mappings of same.

BACKGROUND

More than 10% of women in the western world contract breast cancer, and the success and ease of treatment is highly dependent on early diagnosis. Mammography is the use of low-dose x-ray radiation to image the tissue inside the breast. The technique is used to screen for and diagnose breast cancer by detecting tumors or other changes in breast tissue and aids in early detection of malignant tumors, which improves chances of successful treatment. It can identify abnormalities before a lump can be felt and provides the only reliable method of locating abnormal growths in the milk ducts. Thus it may facilitate locating suspected tumors, prior to a biopsy or surgery.

In consequence of the dangers of breast cancer and the success of mammography, the guidelines laid by the U.S. Department of Health and Human Services (HHS), the American Cancer Society (ACS), the American Medical Association (AMA) and the American College of Radiology (ACR) recommend that screening mammograms be performed annually for all women over the age of 40 in good health, with annual mammograms being advisable at earlier ages for women with a family history of breast cancer or having had prior breast biopsies.

In mammography, the breast is compressed between two plates and exposed to X-rays. Two pictures of each breast are generally taken during a screening mammogram, with extra images from different angles being sometimes necessary for women with breast implants. With so many scans requiring analysis, it is essential to automate the analysis as much as possible and to optimize the examination of the medical images, both by increased accuracy of the analysis and by faster processing times.

Now the size and shape of the breast is highly variable between women and the thickness of the compressed tissues being imaged differs significantly between subjects. The tissue composition of the breast is also highly variable and therefore the average absorption of X-rays by the breast tissue varies significantly between women.

The conventional approach to automated analysis of breast X-ray images is segmentation to determine the outline of the breast followed by analysis of suspect regions shown within the outline, to ascertain whether they are benign or malignant. The density, size and texture of breasts are so very variable that determination of the boundary of the breast in x-ray images is not easy. Categorizing suspect regions as tumors and ascertaining them as benign, malignant, uncertain or false objects or artifacts is not trivial. The shape and size of the tumors varies considerably. Asymmetry and indistinct boundaries on one edge of the suspect region are indicative of malignancy. Early diagnosis is very important as the chances of a cure are highly dependent on early treatment.

Digital mammography is preferably to conventional film in that better contrast is available. Digital mammogram images are stored as digital pictures which can be transmitted easily for remote consultation.

Compared to other anatomical regions, the breast has very low physical contrast because it is composed completely of soft tissues. In general, the breast consists of a background of fat surrounding the slightly denser, glandular structures and pathologic tissues or cysts if they are present. Typical breast calcifications are very small and thin and produce low physical contrast despite calcium being somewhat denser and having a higher atomic number than the elements of soft tissues.

Mammography is generally performed with a spectrum containing photons within a relatively narrow energy range (19 keV-21 keV) in an attempt to obtain high contrast with minimal dosage. The spectrum is produced using the characteristic radiation from a molybdenum anode x-ray tube and filtered by either a molybdenum or a rhodium filter.

The molybdenum anode, molybdenum filter system is quite good for general mammography in that it provides a spectrum that is very close to the optimum spectrum for smaller and less dense breasts. Many mammography machines give the operator the opportunity of selecting between molybdenum and rhodium filters, the latter being useful when imaging denser breasts.

Some systems have dual track anodes so that either molybdenum or rhodium can be selected as the anode material. Because of its higher atomic number (Z) rhodium produces characteristic x-radiation with higher energies than molybdenum. When the rhodium anode is selected, the beam penetration is increased. Generally, this produces better results when imaging dense breast. Since the physical parameters of X-ray sources used for mammography vary between different systems, a high variability is introduced between mammography images which is an artifact of the imaging parameters and not a result of different physiologies.

Although the magnification, brightness, contrast and orientation can be altered in digital X-ray images to display the breast tissue more clearly, such image enhancement techniques are required to be extensively automated by simple procedures to enable fast and accurate diagnosis.

In order to assist radiologists in diagnosing breast cancer from mammography images, Computer Aided Detection (CAD) of suspect regions has been introduced and is used at a growing number of clinical sites.

CAD systems for mammography, and indeed, for determining lung cancer as well, are based essentially on five basic processing steps:

(1) Segmentation of the organ to be analyzed;
(2) Location of lesion candidates;
(3) Extraction of the boundaries of lesion candidates;
(4) Extraction of feature parameters of lesion candidates, and
(5) Discrimination between lesions and false candidates using feature based classifiers.

In the early stages of the CAD process, many lesion candidates are generated. In order for the CAD process to reach a high level of performance (sensitivity and specificity), the probability of malignancy for each lesion candidate needs to be evaluated as accurately as possible. This evaluation is achieved by using a large number of quantitative features that are generally extracted from pixel values in the area of the candidate in the image. Using various statistical methods, the extracted features are combined by a classifier and each lesion candidate is then either validated or discarded.

The continuous efforts for improving the performance of the CAD algorithms for mammography, lung cancer diagnosis, and other applications, focus generally on extracting new features and in modifying the way the features are currently extracted in order to raise their statistical significance. The performance of the CAD algorithms may also be improved through a more effective combination of the extracted features in the classifier. Other tissues and organs may become cancerous, and the diagnoses of tumors therein have analogous problems to a greater or lesser degree.

It is known that malignant lesions tend to appear more often in certain regions of the breast. This knowledge is used by radiologists in analyzing mammograms. There is a need to prove the efficiency, i.e. both the throughput and accuracy, of CAD analysis for medical diagnostic purposes, particularly to further automate the analysis of mammograms to improve throughput and accuracy of diagnosis, and the present invention addresses this need.

SUMMARY OF THE INVENTION

It is an aim of embodiments of the invention, to help automate diagnosis of malignancies in images of body tissue.

It is a particular aim, to standardize images of disparately shaped and sized organs, to allow quantitive analysis of suspect regions suspected as being lesions by its position within the organ, to help diagnose lesion candidates as malignant or false positive in terms of their position within the organ.

One aspect of the invention is directed to a method for diagnosing malignancy of suspect regions in a 2D imaging projection of a body organ of a subject comprising the steps of: normalizing the image projection to map regions thereof onto a standard shape; extracting location of regions mapped on the standard shape and using normalized position of a suspect region to assess likelihood that it is malignant.

Optionally and typically, two images of the body organ are taken from different angles, to allow extraction of 3 dimensional data for locating position of suspect region in normalized 3D space.

In one application, the body organ is a mammary gland.

Typically, the suspect region is suspected as being cancerous.

Optionally, the 2D imaging projection is a digital X-ray image.

Optionally, the assessment of likelihood of malignancy of a region comprises comparing location of suspected malignancy with statistical data representing a sample set of a population.

Optionally, the statistical data comprises a pre-established probability mapping of suspected malignancies projected onto the standardized shape.

In one specific embodiment, the malignancy probability mapping is created by a method comprised of the following steps: providing a training set of digital images with regions of known malignancy status; determining the normalized coordinates of each region in the training set of digital images; dividing each normalized digital image into a pre-determined number of cells; calculating the malignancy occurrence frequency for each cell; and generating a malignancy probability map based on the frequency of occurrence in each cell.

Where, as is often the case, the organ is one of a pair and the digital images comprises images of left and right organs of organs occurring in pairs, the probability mapping comprises laterally reflecting images to pool data from both sides of the body.

Typically, the statistical data comprises a probability mapping of false positives onto the standardized shape.

Optionally, the probability mapping of false positives is created by the method comprised the steps of: providing a training set of digital images featuring detected false positives; determining the normalized coordinates of each false positive in each digital images within the training set; dividing each of the digital images into a pre-determined number of cells and, based on the normalized coordinates of all the false candidates in the set of images, calculating the false object occurrence frequency for each cell; and generating a false positive probability map based on the frequency of occurrence of false positives in each cell.

Optionally, the sample set is selected from the list comprising: a large random population, a large same sex population, a population within a specific age range, a population sharing genetic similarities, and an ethnic population.

Optionally, the sample set is a set of one and the method comprises comparing the normalized image of the body organ mapped onto a single normalized reference image.

Optionally, the reference image is a previously obtained image of the same organ.

Alternatively, the organ is one of a pair and the normalized image of the body organ is compared with a normalized image of the paired organ.

Typically in such a scenario, one of said normalized images is laterally reflected to cancel effect of asymmetry of the organ.

Alternatively again, the reference image is an image of an equivalent organ for a related subject.

Typically, the step of normalizing comprises identifying positions of regions in polar coordinates.

Optionally, the method further comprises converting the polar coordinates into Cartesian coordinates.

Optionally, the step of normalizing the coordinates in polar coordinates further comprises the steps of: segmenting the projection image of the body organ from its background; defining a unit vector from an origin point in the digital image to any tissue contour point resulting from said segmenting and determining the origin point in the digital image and an extreme point therein, thereby forming a zero angle vector; normalizing vectors of all suspect regions in terms of polar angles based on the zero angle vector and on the unit vector crossing each suspect region.

Optionally, the method further includes the step of smoothing the probability maps.

In a second aspect, the present invention is directed to providing a malignancy probability mapping of a projection image of a body organ provided by the method comprising the steps of: providing a training set of digital projection images of body organs including suspect regions of known malignancy status; determining normalized coordinates of each suspect region in the training set of digital projection images; dividing each normalized digital projection image into a predetermined number of cells; calculating the malignancy occurrence frequency for each cell; and generating a malignancy probability map based on the frequency of occurrence in each cell.

Typically, the step of determining normalized coordinates comprises segmenting the projection image of the body organ from its background; defining a unit vector from an origin point in the digital image to any tissue contour point resulting from said segmenting and determining the origin point in the digital image and an extreme point therein, thereby forming a zero angle vector; normalizing vectors of all suspect regions in terms of polar angles based on the zero angle vector and on the unit vector crossing each suspect region.

In a third aspect, the present invention is directed to a false positive probability mapping of a projection image of a body organ fabricated by the method comprising the steps of: providing a training set of digital projection images of body organs including suspect regions recognized as being false positives; determining normalized coordinates of each false positive in the training set of digital projection images; dividing each normalized digital projection image into a pre-determined number of cells; calculating the false positive frequency for each cell; and generating a false positive probability map based on the frequency of occurrence in each cell.

Typically, the step of determining normalized coordinates comprises segmenting the projection image of the body organ from its background; defining a unit vector from an origin point in the digital image to any tissue contour point resulting from said segmenting and determining the origin point in the digital image and an extreme point therein, thereby forming a zero angle vector; normalizing vectors of all false positives in terms of polar angles based on the zero angle vector and on the unit vector crossing each false positive.

BRIEF DESCRIPTION OF THE FIGURES

For a better understanding of the invention and to show how it may be carried into effect, reference will now be made, purely by way of example, to the accompanying Figures, wherewith it is stressed that the particulars shown are by way of example and for purposes of illustrative discussion of the preferred embodiments of the present invention only, and are presented in the cause of providing what is believed to be the most useful and readily understood description of the principles and conceptual aspects of the invention.

DESCRIPTION OF PREFERRED EMBODIMENTS

The present invention relates to a method for computing location-related features that may contribute to the effectiveness of Computer Aided Diagnosis (CAD). The ongoing description relates to the specific application of automated analysis of X-ray images of the breast for diagnosing breast cancer, i.e. mammography. It will be appreciated however, that with simple modifications as will be evident to the man of the art, the basic concepts and processes described herein below may be applied to other body organs, such as lungs, for example.

Some embodiments of the invention relate to extracting location-related probabilities of malignancy and of false marking, for suspected tumors. These probabilities are functions of the distribution in mammography images of true malignant lesions and false-positives, i.e. candidate objects at the considered stage in the CAD process, respectively. Both distributions may be learned using a sufficiently large training set of mammograms.

Diagnosis based on location within the breast is inherently challenging due to the wide variation in breast size, shape, density, and other characteristics. A novel approach is described herein, whereby the large variation in breast size, shape and texture is dealt with by transforming the breast image to map the image onto a standard size and shape.

In a first stage, therefore, two types of reference maps are created:

i. Malignancy Probability Maps (MPM)
ii. False Object Probability Maps (FOPM)

The MPM and FOPM are then used to assign probabilities for every candidate tumor based on its position within the breast.

Suspected tumors or lesions identified by the mapping transformation may be marked and then automatically located and examined manually or automatically in the original X-ray image, where the shape and size thereof, may be better appreciated than in the transformed image.

It will be appreciated that the transformation technique described hereinabove is a tool that may be used in conjunction with other diagnostic methods, both automated and manual, and provides further information than that previously obtained and thus supplements that information, it does not necessarily replace other diagnostic techniques, CAD or manual, such as those based on shape and size, for example.

Creation of Probability Maps

All mammography views (CC and MLO) are separately normalized to a standard shape and size by a transformation described herein below. Since to a first approximation, the left and right breast are mirror images of each other, by reflecting the image of the right breast around a vertical axis, the reflected right breast image may be directly compared with the image of the left breast. Probability maps may be created for both left and right breasts by such a reflection followed by pooling, thereby giving twice the sample size, and thus more accurate data. By way of example, the right breast images are reflected. It will be appreciated that left breast images could just as well be reflected and superimposed upon right breast images.

The normalization is effected by extracting polar coordinates of the organ and projecting onto a standard shape, according to the following rules.

(a) A breast segmentation procedure is applied to provide the contour of the breast.
(b) An origin point is defined at the middle of the chest wall border of the breast. For MLO views, the muscle area needs first to be identified. Then the origin point is defined at a fixed height proportion (e.g. 60% of the height) of the chest wall border of the breast, below the muscle.
(c) The nipple extremity is identified, and the zero-angle vector is defined as the vector going from the origin point to the nipple extremity.
(d) Any vector starting at the origin point and reaching the breast border is considered as being of length 1, i.e. a unit vector.

In other words, the shape of the breast is normalized as a hemisphere centered on the arbitrary origin and having a zero-angle vector, i.e. a main axis, through the nipple.

It will be appreciated that whilst normalizing the shape of the female breast as a hemisphere about an axis through the nipple has an inherent logic, the normalization concept is simply an abstracting transformation that may enable physiologically similar objects that occur in varying shapes and sizes to be mapped one onto another. Thus breasts may be normalized onto other shapes or other organs onto hemispheres, and the above detailed technique may be generalized and used for other organs, with other imaging techniques and/or with transformation onto other standards.

Probability Maps

The concept of a Probability Map is that the normalized breast images may be superimposed on each other and regions identified as malignant, benign or false positives will generate clouds of such regions, the position and density thereof, relating to the population as a whole. In this manner, a region of interest appearing in the breast tissue may be identified and analyzed in terms of its normalized position, and a probability of it being malignant or benign may be assigned. The coordinates of the center of every region of interest, i.e. the data set from library images, are calculated in a normalized Polar coordinate system and then converted to Cartesian coordinates. These normalized Cartesian coordinates are added to the relevant list of object center coordinates i.e. the list for Malignant Objects or the list for False Objects.

Once all library images have been processed, the density of regions of interest, whether malignant or benign tumors, can be calculated for every location of the normalized breast image, using the lists of coordinates. However, due to the limited number of library images, which are typically training sets of images used for teaching mammography personnel, the normalized image, which is, of course, a two dimensional projection of the three dimensional breast, needs to be divided into a reasonable number of cells, to provide good spatial resolution while avoiding sampling noise. A 10×10 grid of cells has been found to perform adequately. Based on this division into cells, separate tables of occurrence frequency may be created for malignant and false objects. The number of object centers from the relevant list found at locations within specific cells will appear in each cell of the tables. To attenuate the large variations from cell to cell that are due to the limited available number of objects, i.e. sample size, final MPM and FOPM may be obtained by smoothing the occurrence frequency tables, by a 3×3 flat convolution, for example.

Figure 1A:
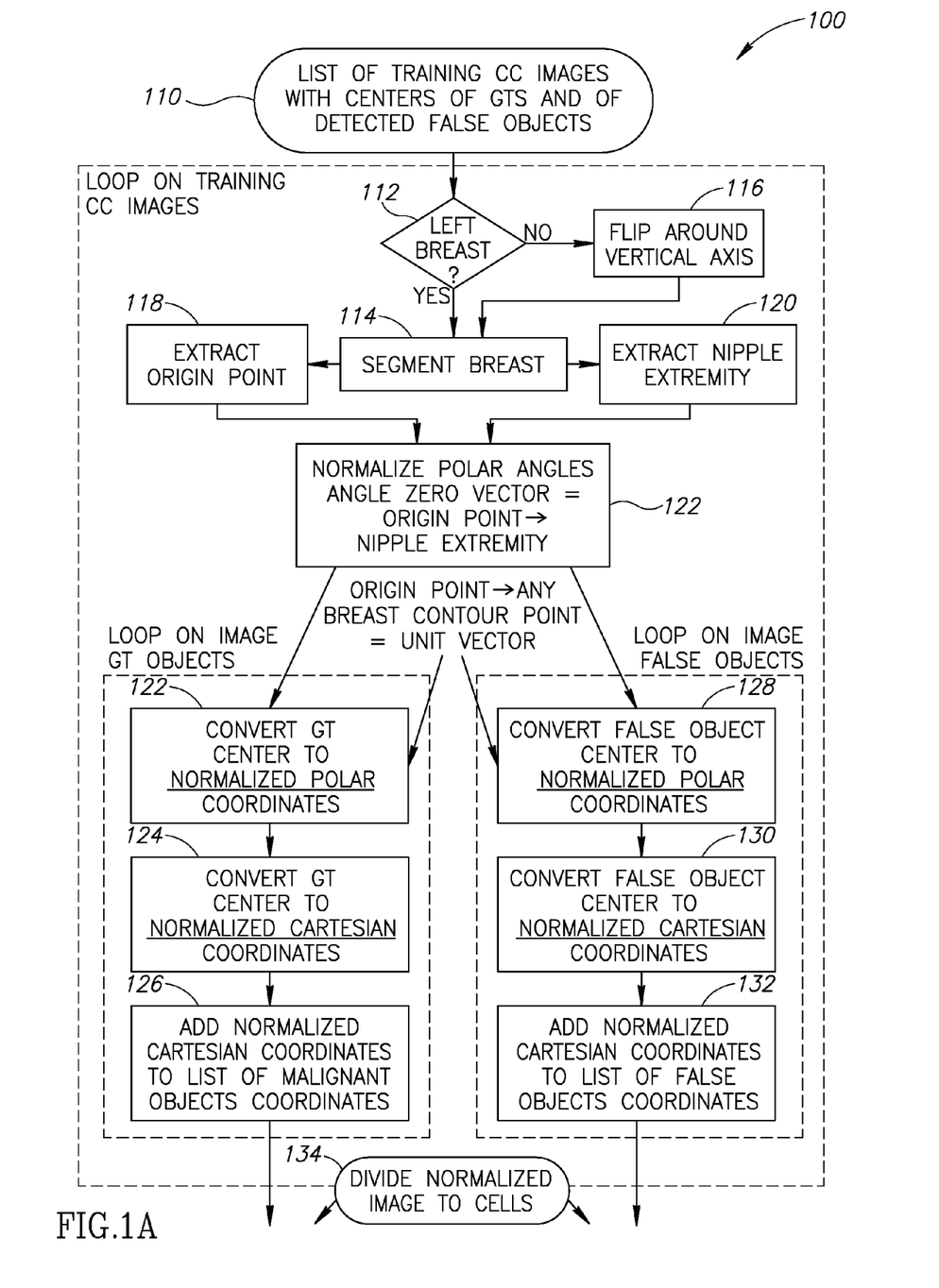
FIGS. 1 and 2 show flowcharts illustrating the method for the creation of a probability maps for craniocaudal (CC) and mediolateral oblique (MLO) views respectively according to one embodiment of the present invention.
Figure 1B:
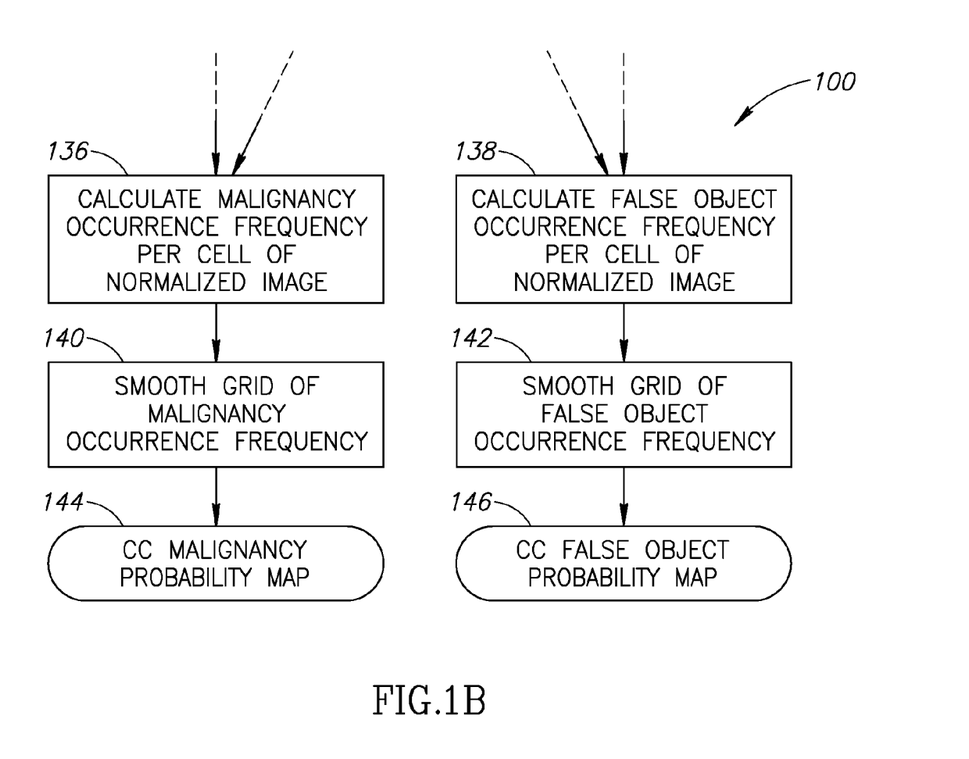

Separate maps need to be established for the two standard projection types used in mammography. With reference to FIG. 1, an exemplary method 100 for generating a Probability Map for a craniocaudal (CC) image is shown. Firstly, a database of training images with the centers of tumors and detected false objects shown is obtained 110. This is typically a series of library images used for training mammography personnel.

By a lateral reflection, the same Probability Maps may be used for analyzing right or left breasts and the number of library teaching images available for generating the probability maps may be doubled by such a reflection. Arbitrarily, the left breast has been selected as the standard orientation, and right breast images are required to be flipped around a vertical axis. Thus, if the image represents a left breast 112 it is then segmented 114 to extract the boundary thereof. If the breast image is not that of a left breast, i.e. is that of a right breast, the image is flipped around the vertical axis 116 and then segmented 114 to extract the boundary. An origin point is defined and its position is extracted 118. The origin point may be defined at a fixed height proportion, such as 60% of the height of the chest wall border of the breast, below the muscle. This is actually quite arbitrary of course. A main axis, i.e. an 'angle zero vector' is defined. For obvious reasons of symmetry, the axis through the nipple extremity is preferred and thus the position of the nipple extremity is extracted 120, and then the segmented breast is normalized 122 by defining all points on the boundary resulting from the segmentation process as unit vectors and converting to polar coordinates, using the line connecting the origin and the nipple extremity as the angle zero vector.

It will be appreciated that different algorithms have been developed for the automated identification of suspect lesions and tumors in software for prior art CAD equipment. For mammography applications, the main types of lesions are masses and clusters of micro-calcifications. Usefully, separate MPM and FOPM are created for the different lesion types. 'Lesion' and 'GT' (Ground Truth) should then be understood below as referring to a specific lesion type.

The GT regions shown in each of the training images 110 are plotted onto the normalized image considering the whole line from the origin, through the center of the GT region and on to the boundary of the segmented image as a unit vector. In this manner, polar coordinates are extracted 122. The polar coordinates of center of the malignancy are then converted into normalized Cartesian coordinates 124 and the normalized Cartesian coordinates of the malignancy (the GT region) are added to a list of such regions 126. As explained hereinabove, the MPM map is primarily based on a training set of mammograms presenting biopsy-proven malignant lesions.

In a similar manner, the FOPM may be constructed using artifacts and benign regions from the same malignant images and/or from normal/negative mammograms. The preferred overall CAD strategy aims to reduce the number of false objects either in the malignant images or in the non-malignant images, so the larger the available data-set, the better.

The areas identified as false objects shown in each of the training images 110 are plotted onto the normalized image considering the whole line from the origin, through the center of the region and on to the boundary of the segmented image as a unit vector. In this manner, polar coordinates are extracted 128. The polar coordinates of the center of the false object are then converted into normalized Cartesian coordinates 130 and the normalized Cartesian coordinates of the false object are added to a list of such features 132.

The normalized breast image is divided into a grid of cells 134, and the frequency of malignancy occurrences are calculated for each cell 136, as are the frequency of false object occurrences 138.

The grid of malignancy occurrence frequency and the corresponding grid of false object occurrence frequency are both smoothed 140, 142, and in this manner, a craniocaudal (CC) Malignancy Probability Map 144 and a false Object Probability Map 146 are both generated.

Figure 2A:
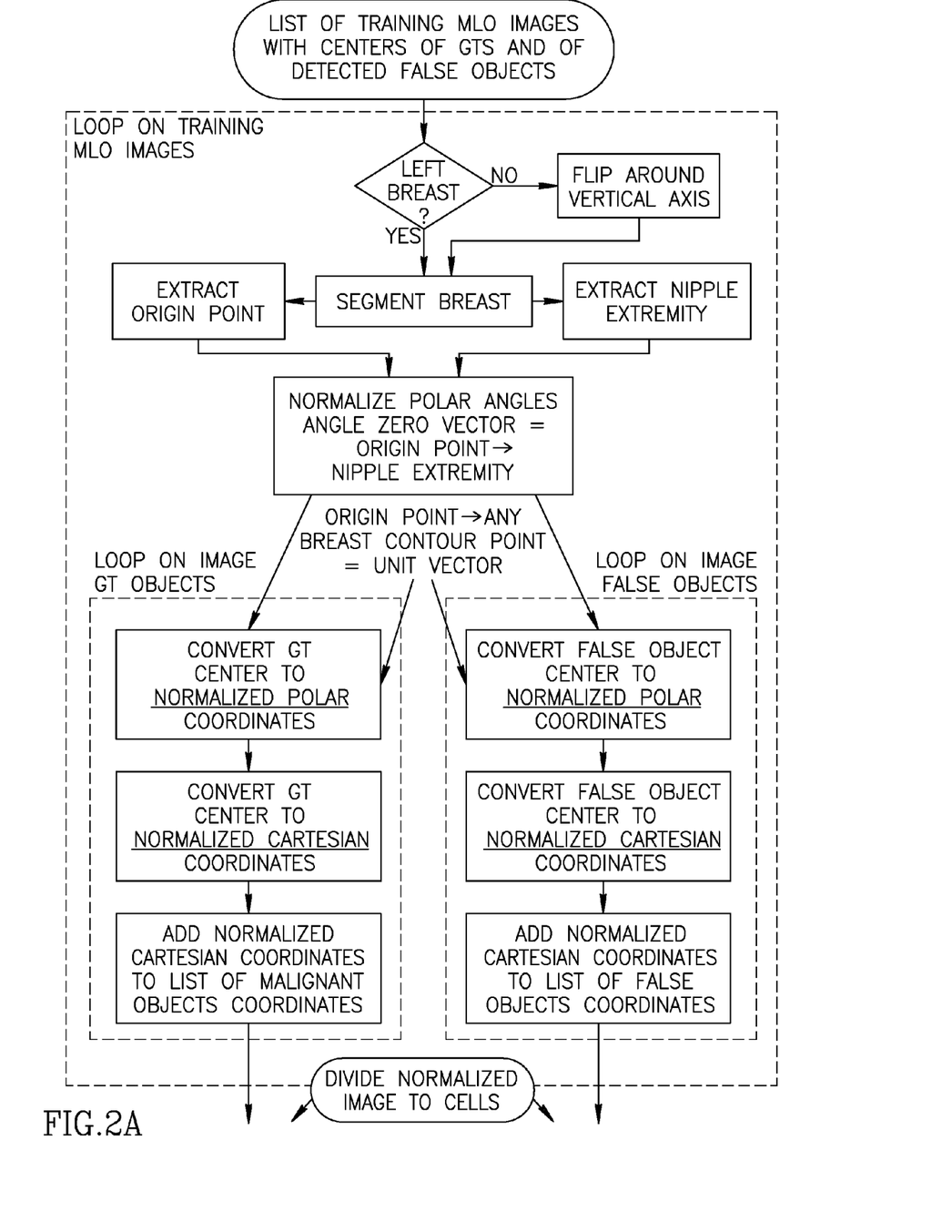
Figure 2B:
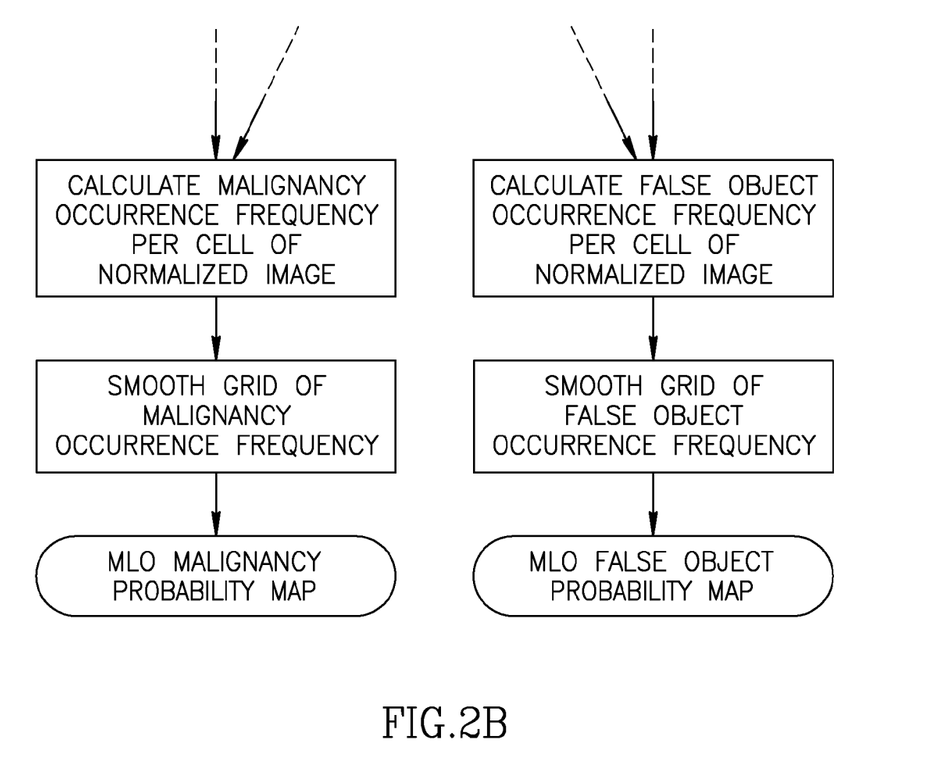

It will be appreciated that the process for creating CC and MLO maps is almost identical. FIG. 2 shows the method of generating a mediolateral oblique (MLO) Probability Map, mutatis mutandis.

Using the Probability Maps

Figure 3:
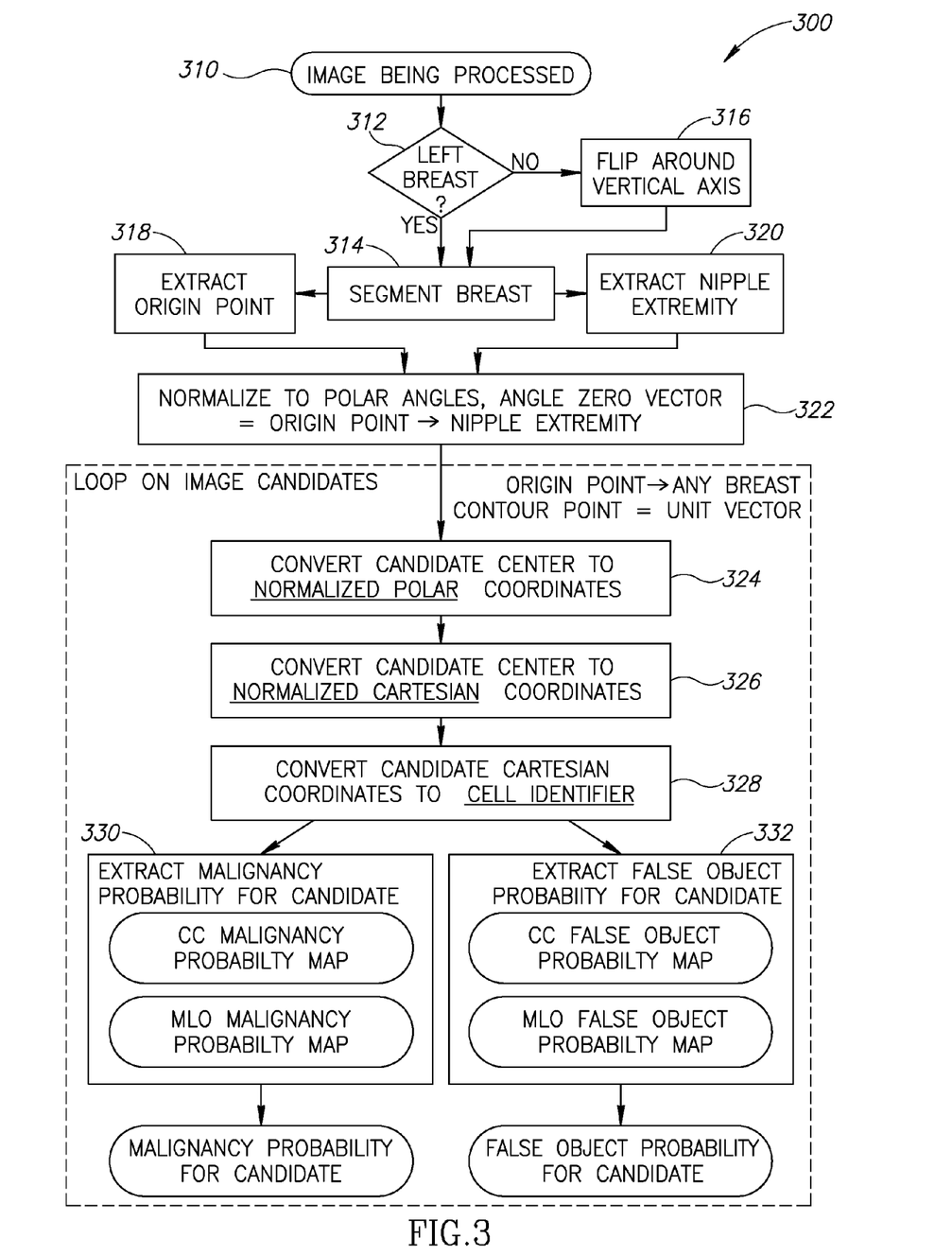
FIG. 3 shows a flowchart for using the probability maps generated by the flowcharts of FIGS. 1 and 2.

With reference to FIG. 3, a process 300 very similar to that described above for generating the Probability Maps themselves is used to assess the probability that a suspect region appearing in a mammogram is a malignancy or a false object.

Firstly, the image to be analyzed with the centers of tumors and detected false objects shown is obtained 310. If the image represents a left breast 312 it is then segmented 314 to extract the boundary thereof. If the breast image is not that of a left breast, i.e. is that of a right breast, the image is flipped around the vertical axis 316 and then segmented 314 to extract the boundary. An origin point is defined and its position is extracted 318. The same origin point as that used for the library images 318 is selected (e.g. 60% of the height of the chest wall border of the breast, below the muscle). The position of the nipple extremity is extracted 320, and then the segmented breast is normalized 322 by defining all points on the boundary resulting from the segmentation process as unit vectors and converting to polar coordinates, using the line connecting the origin and the nipple extremity as the angle zero vector, mutatis mutandis.

In order to extract the malignancy probability from a MPM and the false object probability from a FOPM, the image is first normalized in polar coordinates 324 and then the normalized Cartesian coordinates of the candidate lesions centers are computed 326. Using these coordinates, the corresponding cells of the relevant MPM & FOPM are identified 328, and the probabilities that each considered lesion candidate is malignant 330 on the one hand, or a false object 332 such as a benignancy, are retrieved.

The malignant and false object probabilities 330, 332 may be used 'as is' by a classification/filtration algorithm. However, an assessment of the suspect region may be made by defining new estimators using the two probability numbers. For example, one such estimator may be: [MP(candidate)−FOP(candidate)]/[MP(candidate)+FOP(candidate)].

The present invention can easily be extended to create True Object Probability Maps (TOPM) and False Object Probability Maps (FOPM) for help in the detection or the classification of objects in all medical imaging modalities, including 3-D modalities. The invention can also be applied to any detection or classification task in non-medical imaging. It may be also applied to medical imaging of organs other than the breast, such as lung, colon or liver.

Although described above with reference to a library of teaching mammograms, thereby generating probability maps for the (female) population as a whole, it will be appreciated that the system may be self-teaching, using data it generates for self-optimization. It is possible to generate sample sets for particular ethnic groups, for example, or to compare mammograms for different family members, such as where a breast cancer gene is suspected or identified. Furthermore, the breasts of some women are asymmetric. Each breast size and shape changes through the lifetime of the woman as her body develops, matures and then ages, with puberty, menopause, pregnancy, nursing and dieting all having an effect on the shape and size of the breast. Since the above method allows breast normalization, it provides a convenient way of comparing mammograms over a period of time.

Thus the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A method for diagnosing malignancy of suspect regions in a 2D imaging projection of a body organ of a subject comprising the steps of:
    normalizing the imaging projection to map regions thereof onto a standard shape having a zero-angle vector defined from an origin point to a tissue contour point; and
    extracting location of regions mapped on the standard shape and using normalized position of a suspect region to assess likelihood that it is malignant.

2. The method of claim 1 wherein two images of the body organ are taken from different angles, to allow extraction of 3 dimensional data for locating position of suspect region in normalized 3D space.

3. The method of claim 1, wherein the body organ is a mammary gland.

4. The method of claim 1 wherein the suspect region is suspected as being cancerous.

5. The method of claim 1 wherein the 2D imaging projection is a digital X-ray image.

6. The method of claim 1 wherein the assessment of likelihood of malignancy of a region comprises comparing location of suspected malignancy with statistical data representing a sample set of a population.

7. The method of claim 6 wherein the statistical data comprises a pre-established probability mapping of suspected malignancies projected onto the standard shape.

8. The method of claim 7 wherein the malignancy probability mapping is created by a method comprised of the following steps:
    providing a training set of digital images with regions of known malignancy status;
    determining the normalized coordinates of each region in the training set of digital images;
    dividing each normalized digital image into a pre-determined number of cells;
    calculating the malignancy occurrence frequency for each cell; and
    generating a malignancy probability map based on the frequency of occurrence in each cell.

9. The method of claim 8 wherein the organ is generally one of a pair and the digital images comprises images of left and right organs of organs occurring in pairs and the probability mapping comprises laterally reflecting images to pool data from both sides of the body.

10. The method of claim 6 wherein the statistical data comprises a probability mapping of false positives projected onto the standardized standard shape.

11. The method of claim 10, wherein the probability mapping of false positives are created by the method comprised the steps of:
    providing a training set of digital images featuring detected false positives;
    determining the normalized coordinates of each false positive in each digital images within the training set;
    dividing each of the digital images into a pre-determined number of cells and, based on the normalized coordinates of all the false candidates in the set of images, calculating the false object occurrence frequency for each cell; and
    generating a false positive probability map based on the frequency of occurrence of false positives in each cell.

12. The method of claim 6 wherein the sample set is selected from the list comprising:
    a large random population, a large same sex population, a population within a specific age range, a population sharing genetic similarities, and an ethnic population.

13. The method of claim 6 wherein the sample set is a set of one and the method comprises comparing the normalized image of the body organ mapped onto a single normalized reference image.

14. The method of claim 13 wherein the reference image is a previously obtained image of the same organ.

15. The method of claim 13 wherein the organ is one of a pair and the normalized image of the body organ is compared with a normalized image of the paired organ.

16. The method of claim 13 wherein one of said normalized images is laterally reflected to cancel effect of asymmetry of the organ.

17. The method of claim 13 wherein the reference image is an image of an equivalent organ for a related subject.

18. The method of claim 1 wherein the step of normalizing comprises identifying positions of a suspect region in polar coordinates.

19. The method of claim 18 further comprises converting the polar coordinates into Cartesian coordinates.

20. The method according to claim 18, wherein the step of normalizing the coordinates in polar coordinates further comprises the steps of segmenting the imaging projection of the body organ from its background;

defining a unit vector from the origin point in the digital image to any tissue contour point resulting from said segmenting and determining the origin point in the digital image and an extreme point therein, thereby forming the zero angle vector; and normalizing vectors of all suspect regions in terms of polar angles based on the zero angle vector and on the unit vector crossing each suspect region.

21. The method of claim 20 further including the step of smoothing the probability maps.

22. A malignancy probability mapping of a projection image of a body organ, created by the method comprising the steps of:

providing a training set of digital projection images of body organs including suspect regions of known malignancy status;

determining normalized coordinates of each suspect region in the training set of digital projection images by mapping the suspect region onto a standard shape having a zero-angle vector defined from an origin point to a tissue contour point;

dividing each normalized digital projection image into a grid of pre-determined number of cells;

calculating the malignancy occurrence frequency for each cell; and generating a malignancy probability map based on the frequency of occurrence in each cell.

23. The method of claim 22 wherein the step of determining normalized coordinates comprises:

segmenting the projection image of the body organ from its background;

defining a unit vector from the origin point in the digital image to any tissue contour point resulting from said segmenting and determining the origin point in the digital image and an extreme point therein, thereby forming the zero angle vector;

normalizing vectors of all suspect regions in terms of polar angles based on the zero angle vector and on the unit vector crossing each suspect region.

24. A false positive probability mapping of a projection image of a body organ, fabricated by the method comprising the steps of:

providing a training set of digital projection images of body organs including suspect regions recognized as being false positives; determining normalized coordinates of each false positive in the training set of digital projection images;

dividing each normalized digital projection image into a pre-determined number of cells;

calculating the false positive frequency for each cell; and generating a false positive probability map based on the frequency of occurrence in each cell.

25. The method of claim 22 wherein the step of determining normalized coordinates comprises segmenting the projection image of the body organ from its background;

defining a unit vector from an origin point in the digital image to any tissue contour point resulting from said segmenting and determining the origin point in the digital image and an extreme point therein, thereby forming a zero angle vector;

normalizing vectors of all false positives in terms of polar angles based on the zero angle vector and on the unit vector crossing each false positive.

* * * * *